(12) United States Patent
Kim et al.

(10) Patent No.: US 11,371,177 B2
(45) Date of Patent: Jun. 28, 2022

(54) WASHING MACHINE

(71) Applicant: SAMSUNG ELECTRONICS CO., LTD., Suwon-si (KR)

(72) Inventors: Ji Ho Kim, Suwon-si (KR); Hee Jin Kang, Suwon-si (KR); Soo Hwan Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 16/618,674

(22) PCT Filed: Mar. 23, 2018

(86) PCT No.: PCT/KR2018/003425
§ 371 (c)(1),
(2) Date: Dec. 2, 2019

(87) PCT Pub. No.: WO2018/221846
PCT Pub. Date: Dec. 6, 2018

(65) Prior Publication Data
US 2020/0116287 A1    Apr. 16, 2020

(30) Foreign Application Priority Data
May 31, 2017    (KR) .................. 10-2017-0067993

(51) Int. Cl.
*D06F 39/08*    (2006.01)
*D06F 39/12*    (2006.01)
(Continued)

(52) U.S. Cl.
CPC ............ *D06F 39/08* (2013.01); *D06F 39/083* (2013.01); *D06F 39/12* (2013.01); *F16L 55/035* (2013.01); *D06F 37/42* (2013.01); *F16L 3/12* (2013.01)

(58) Field of Classification Search
CPC ........ D06F 39/08; D06F 39/083; D06F 39/12; D06F 37/42; F16L 55/035; F16L 3/13;
(Continued)

(56) References Cited

U.S. PATENT DOCUMENTS 2,252,072 A * 8/1941 Gerhardt ............... D06F 39/083
D32/12
5,190,251 A * 3/1993 Bodo ...................... F16L 3/237
248/68.1
(Continued)

FOREIGN PATENT DOCUMENTS

CN          1542211 A      11/2004
JP      2005-188578 A       7/2005
(Continued)

OTHER PUBLICATIONS

Cho Yong Suk, "Clamp", Mar. 2012, KR-20120029094-A—Machine Translation (Year: 2012).*
(Continued)

*Primary Examiner* — David G Cormier
*Assistant Examiner* — Thomas Bucci
(74) *Attorney, Agent, or Firm* — Staas & Halsey LLP

(57) ABSTRACT

There is proposed a washing machine including an improved holder capable of fixing a hose. The washing machine includes a cabinet, a tub provided inside the cabinet, a drain pump provided to discharge washing water accommodated in the tub to the outside of the cabinet, a drain hose configured to guide the washing water pumped by the drain pump to the outside of the cabinet, and a holder coupled to an outer surface of the cabinet to fix the drain hose to the cabinet, wherein the holder includes an accommodating portion provided to accommodate the drain hose and a damping portion configured to cause the drain hose to be spaced apart from the cabinet so that, when the washing (Continued)

water is drained, vibration of the drain hose due to the drain pump is prevented from being transmitted to the cabinet.

20 Claims, 11 Drawing Sheets

(51) Int. Cl.
  *F16L 55/035* (2006.01)
  *F16L 3/12* (2006.01)
  *D06F 37/42* (2006.01)
(58) Field of Classification Search
  CPC ......... F16L 3/223; F16L 3/12; F16L 37/0987; F16L 3/06; F16L 3/08
  USPC .......................................................... 68/208
  See application file for complete search history.

(56) References Cited

U.S. PATENT DOCUMENTS

| | | | | |
|---|---|---|---|---|
| 5,458,303 A | * | 10/1995 | Ruckwardt | H02G 3/26 248/68.1 |
| 5,588,683 A | * | 12/1996 | Schliessner | H02G 3/26 248/74.2 |
| 5,797,675 A | * | 8/1998 | Tanner, Jr. | F21V 15/00 248/50 |
| 7,549,613 B1 | * | 6/2009 | Ismert | F16L 3/12 248/73 |
| 7,594,583 B2 | * | 9/2009 | Whipple | B60K 15/04 248/74.2 |
| 7,721,396 B2 | * | 5/2010 | Fleischman | A47C 1/14 248/74.2 |
| 8,882,059 B2 | * | 11/2014 | Schmidt | F16L 3/1041 248/65 |
| 9,522,638 B2 | * | 12/2016 | Oga | H01B 1/023 |
| 9,548,597 B2 | * | 1/2017 | Vacca | H02G 3/32 |
| 9,758,111 B2 | * | 9/2017 | Stau | H02G 3/32 |
| 2002/0066835 A1 | * | 6/2002 | Sentpali | F16L 55/035 248/74.1 |
| 2005/0139732 A1 | * | 6/2005 | Kato | H02G 3/32 248/71 |
| 2007/0101774 A1 | * | 5/2007 | Lee | D06F 39/12 68/3 R |
| 2007/1017741 | | 5/2007 | Lee | |
| 2015/0115784 A1 | * | 4/2015 | Busing | F16L 3/04 137/590 |
| 2015/0128663 A1 | * | 5/2015 | Lee | D06F 39/085 68/3 R |
| 2018/0015894 A1 | * | 1/2018 | Zaldivar Ortiz | B60R 16/0215 |

FOREIGN PATENT DOCUMENTS

| | | |
|---|---|---|
| KR | 10-2006-0085968 A | 7/2006 |
| KR | 10-1057712 B1 | 8/2011 |
| KR | 101057712 B1 * | 8/2011 |
| KR | 10-2012-0029094 A | 3/2012 |
| KR | 20120029094 A * | 3/2012 |

OTHER PUBLICATIONS

Yu; Jeonggi, "Fixing Device of Washing Machine Drain Hose", Aug. 2011, KR-101057712-B1—Machine Translation (Year: 2011).*
European Search Report for European Patent Application No. 18810662.9 dated Jan. 23, 2020.
European Office Action for European Patent Application No. 18810662.9 dated Nov. 5, 2021.
Korea Office Action for Korean Patent Application No. 10-2017-0067993 dated Apr. 13, 2022.

* cited by examiner

[Fig. 1]
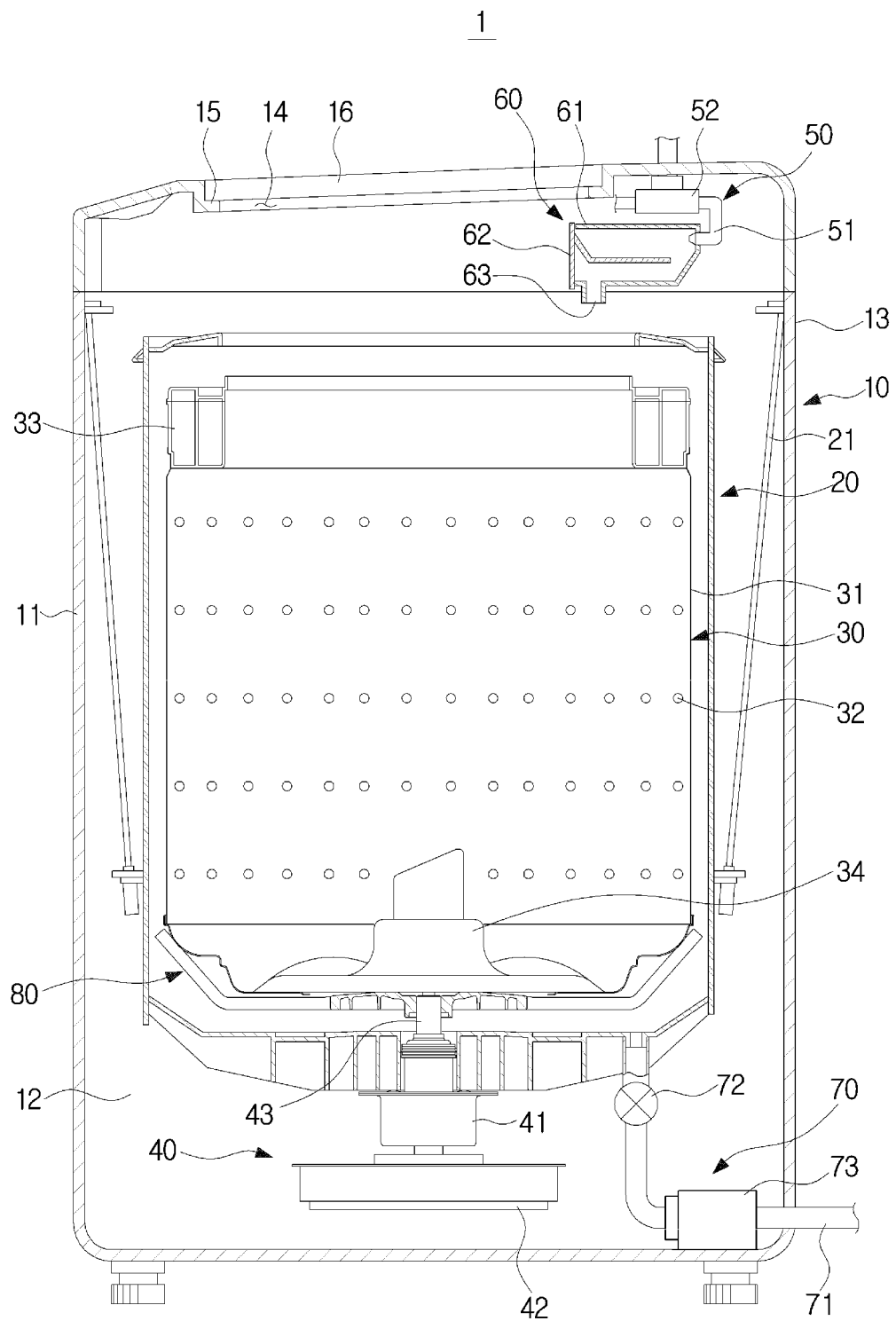

【Fig. 2】
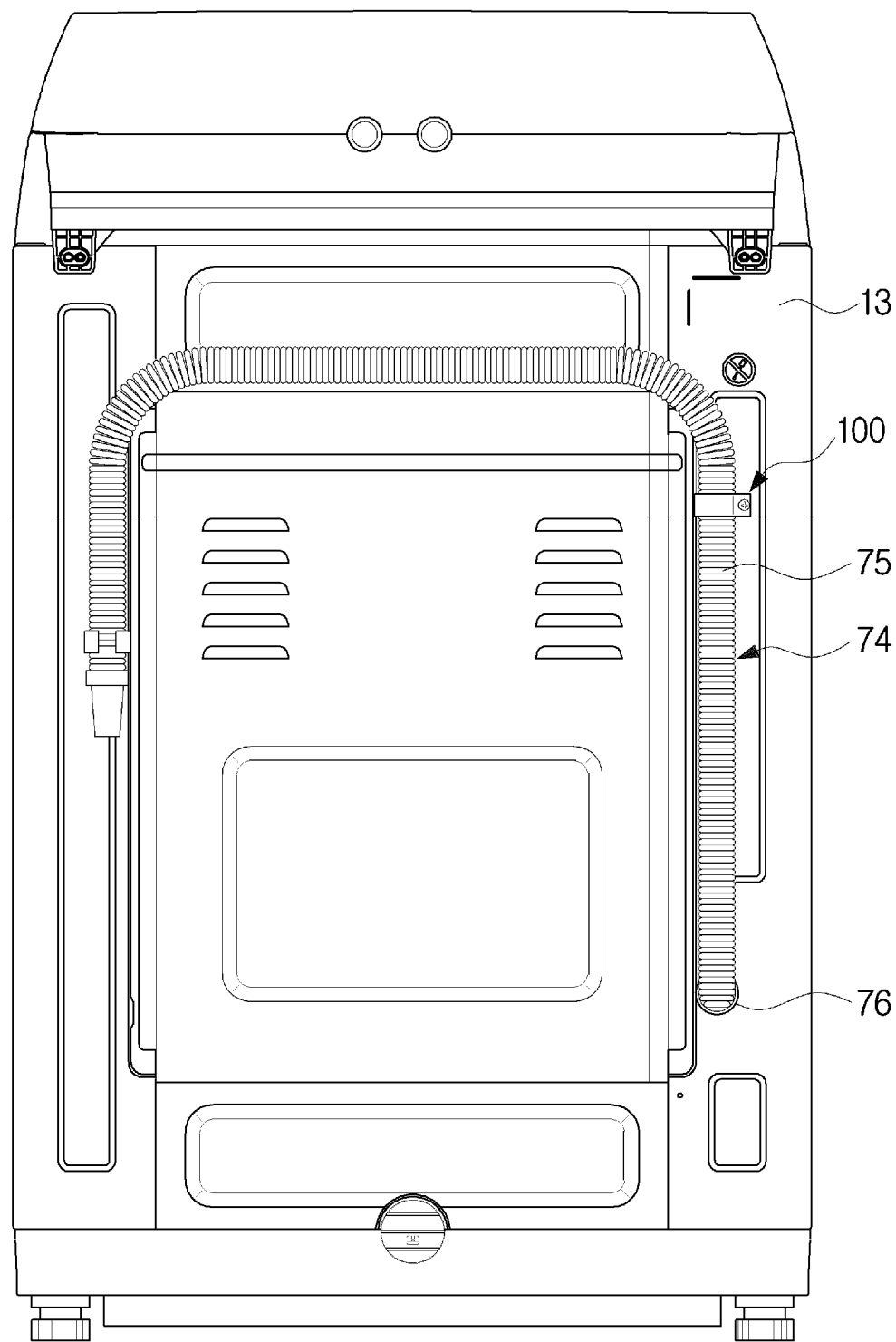

【Fig. 3】
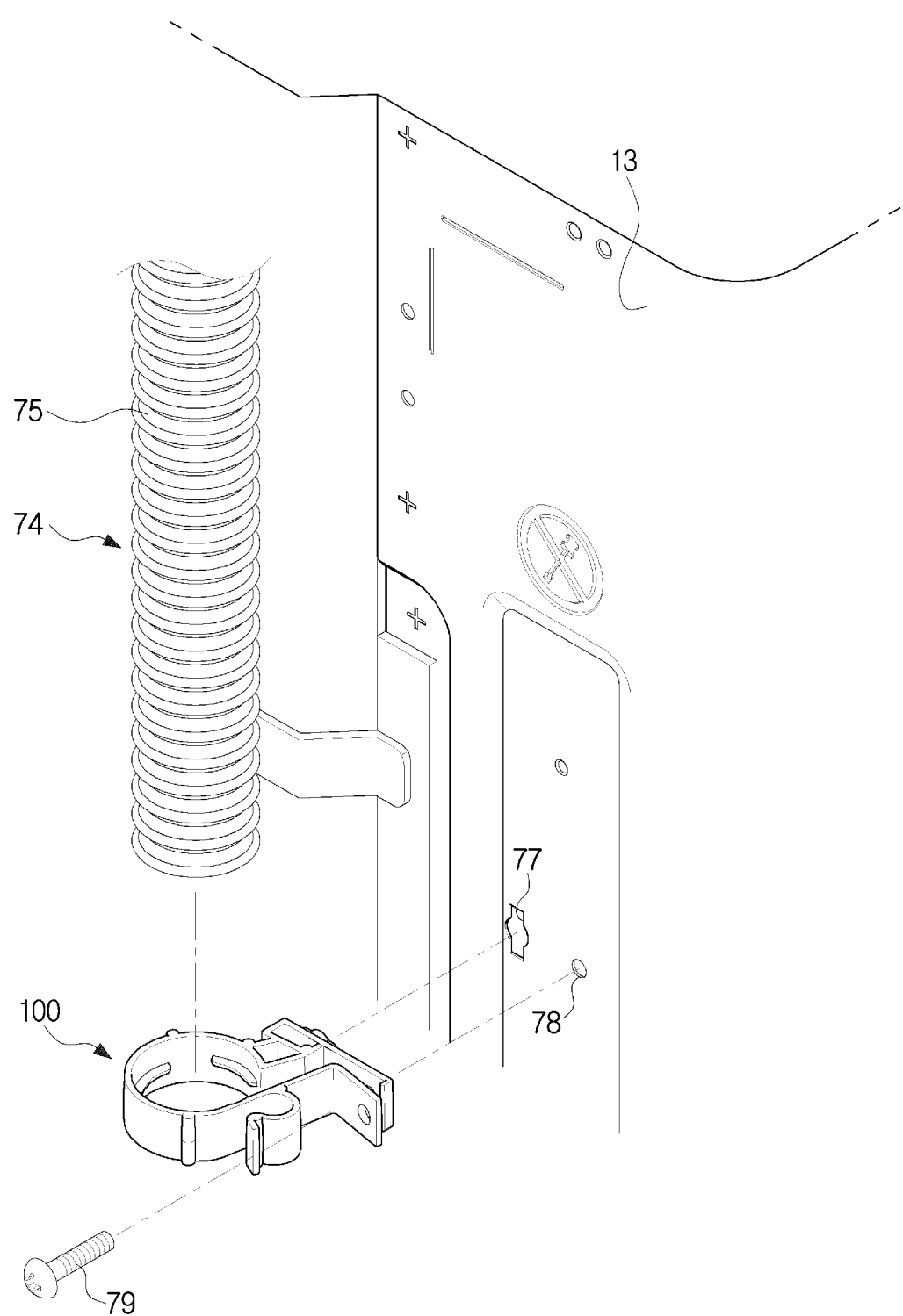

[Fig. 4]
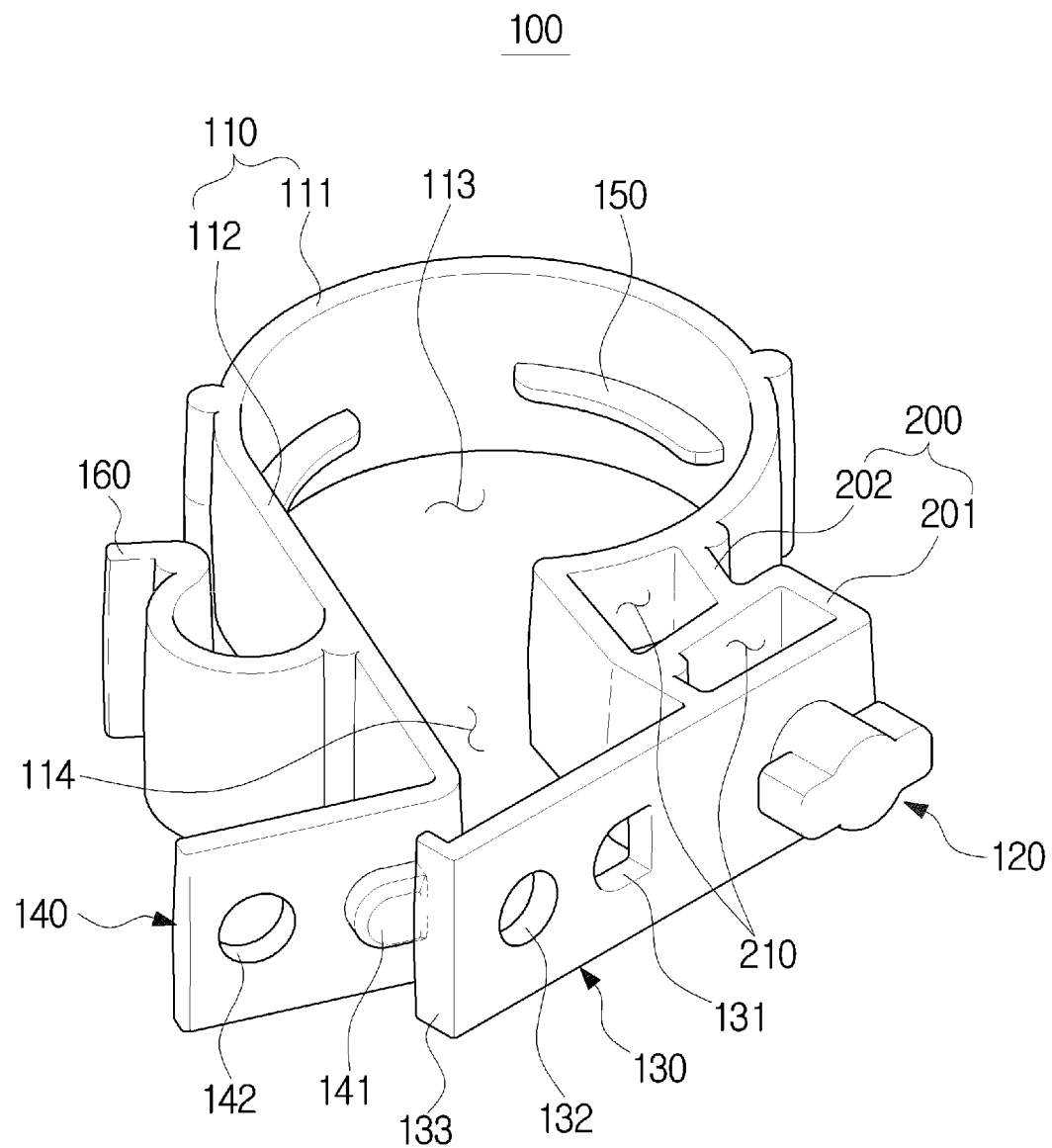

[Fig. 5]
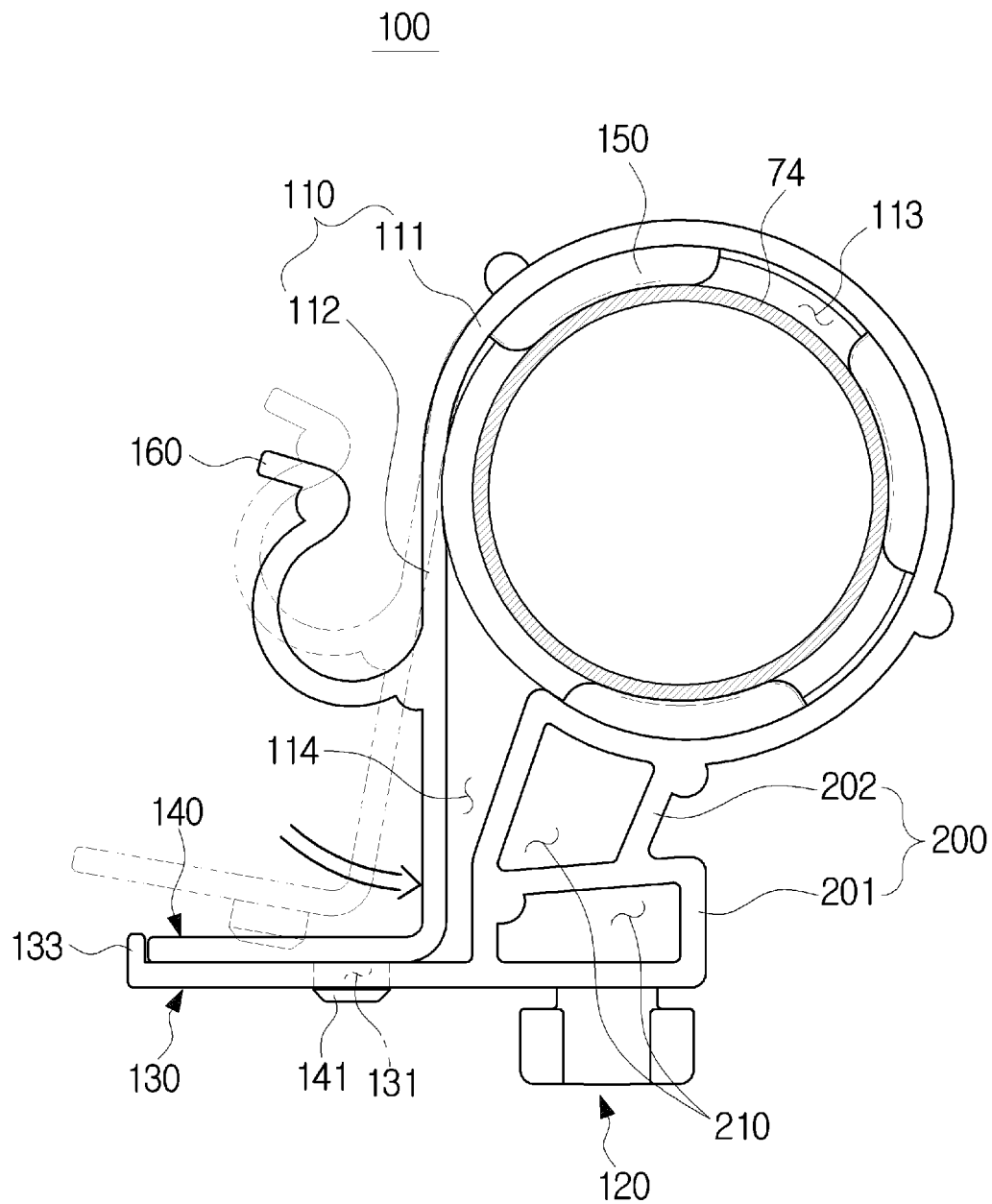

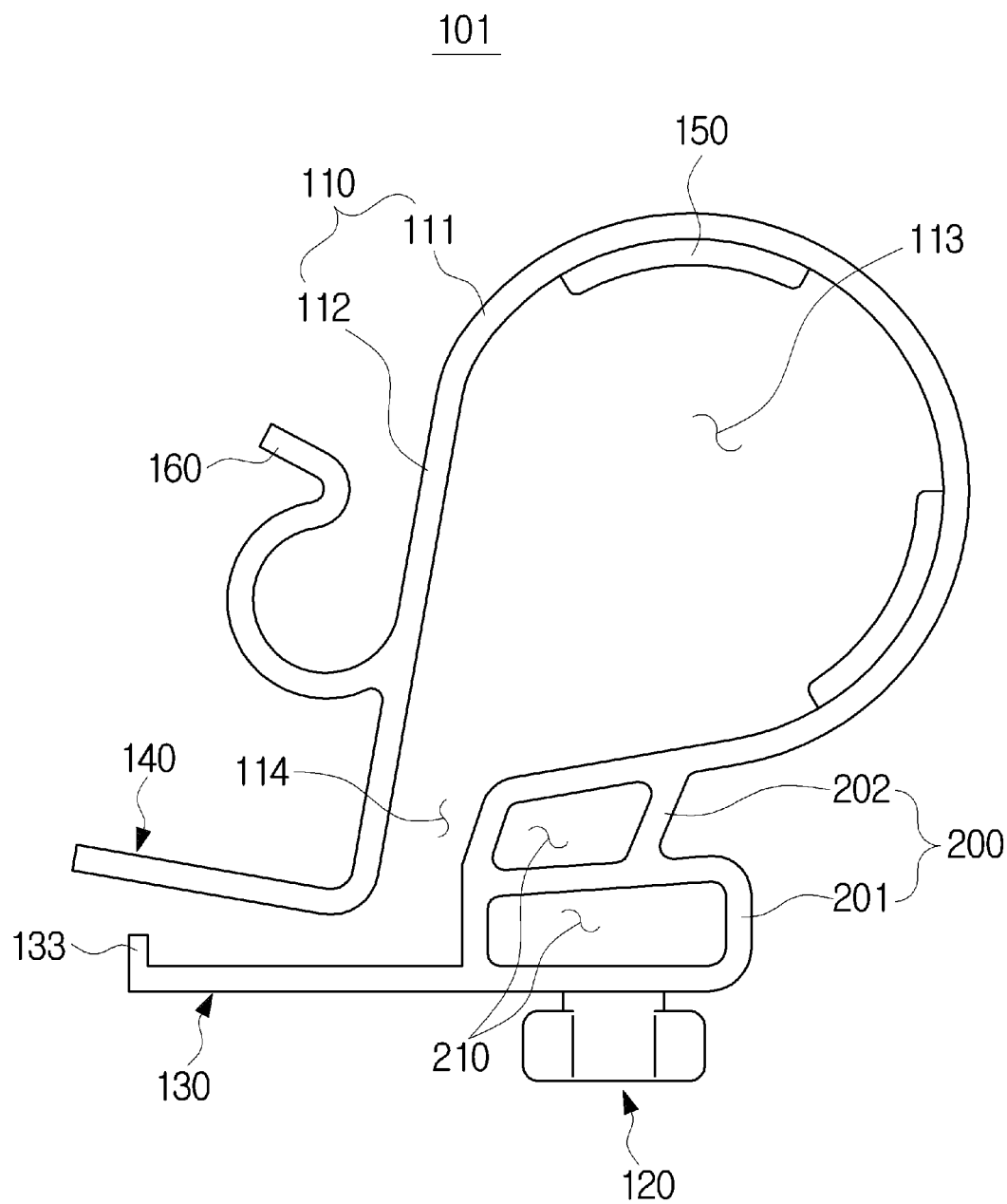
[Fig. 6]

[Fig. 7]
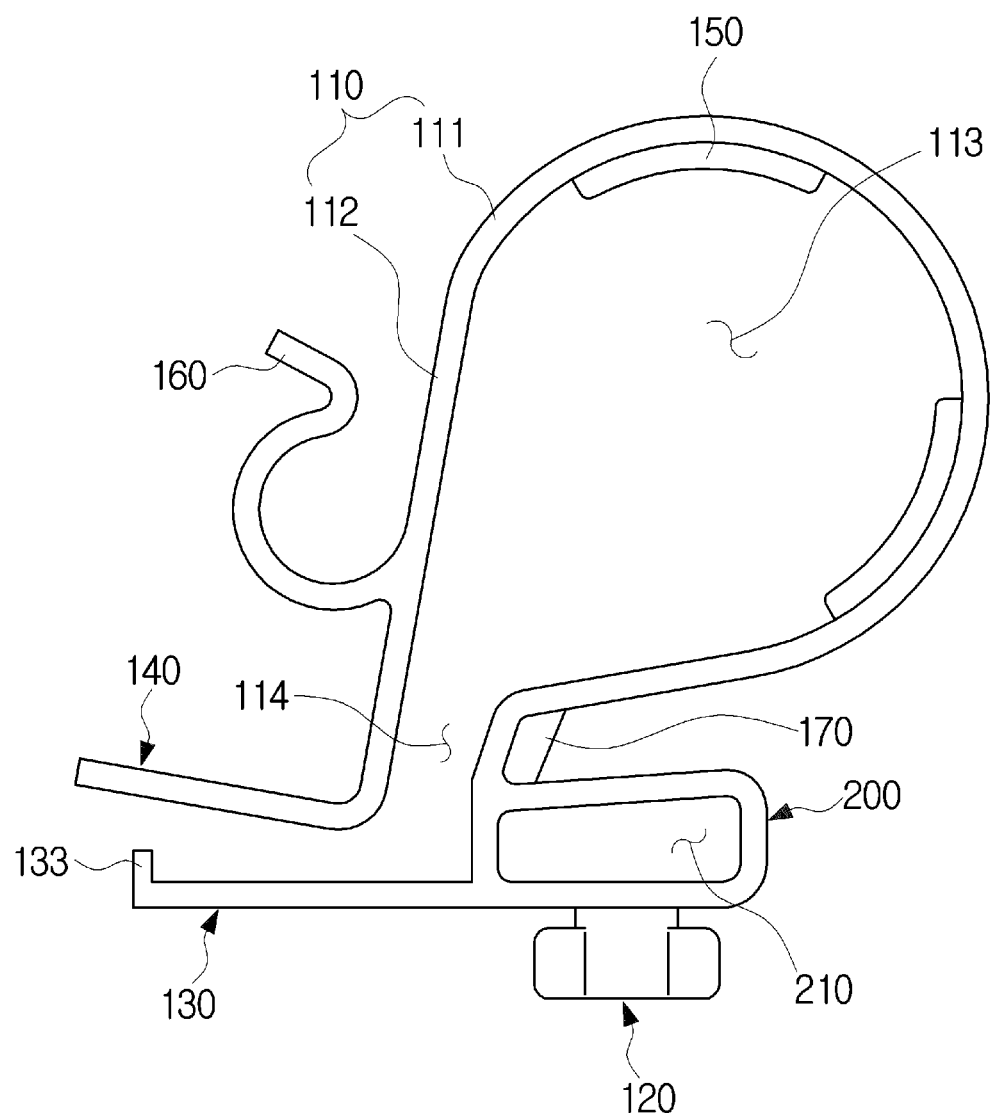

[Fig. 8]
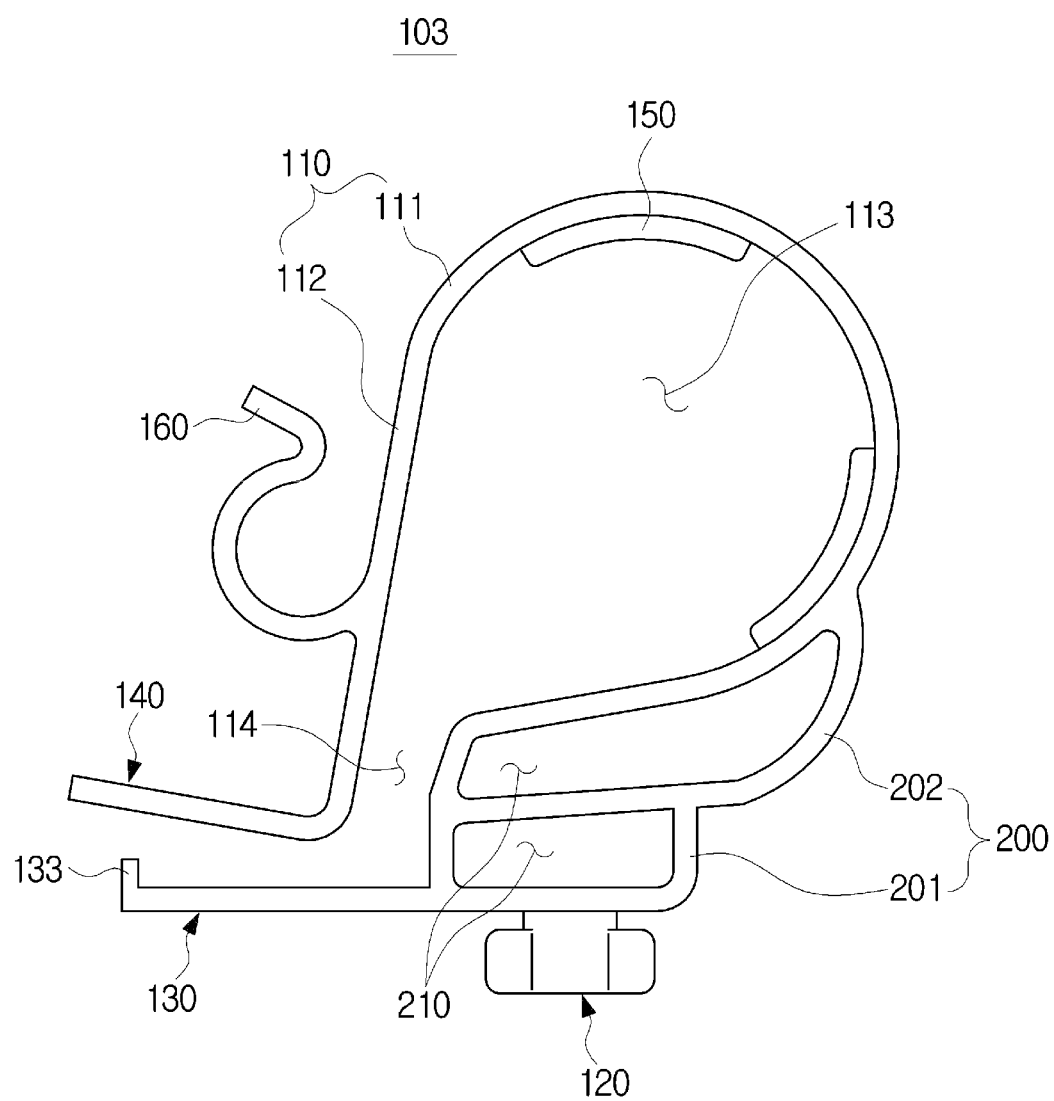

[Fig. 9]
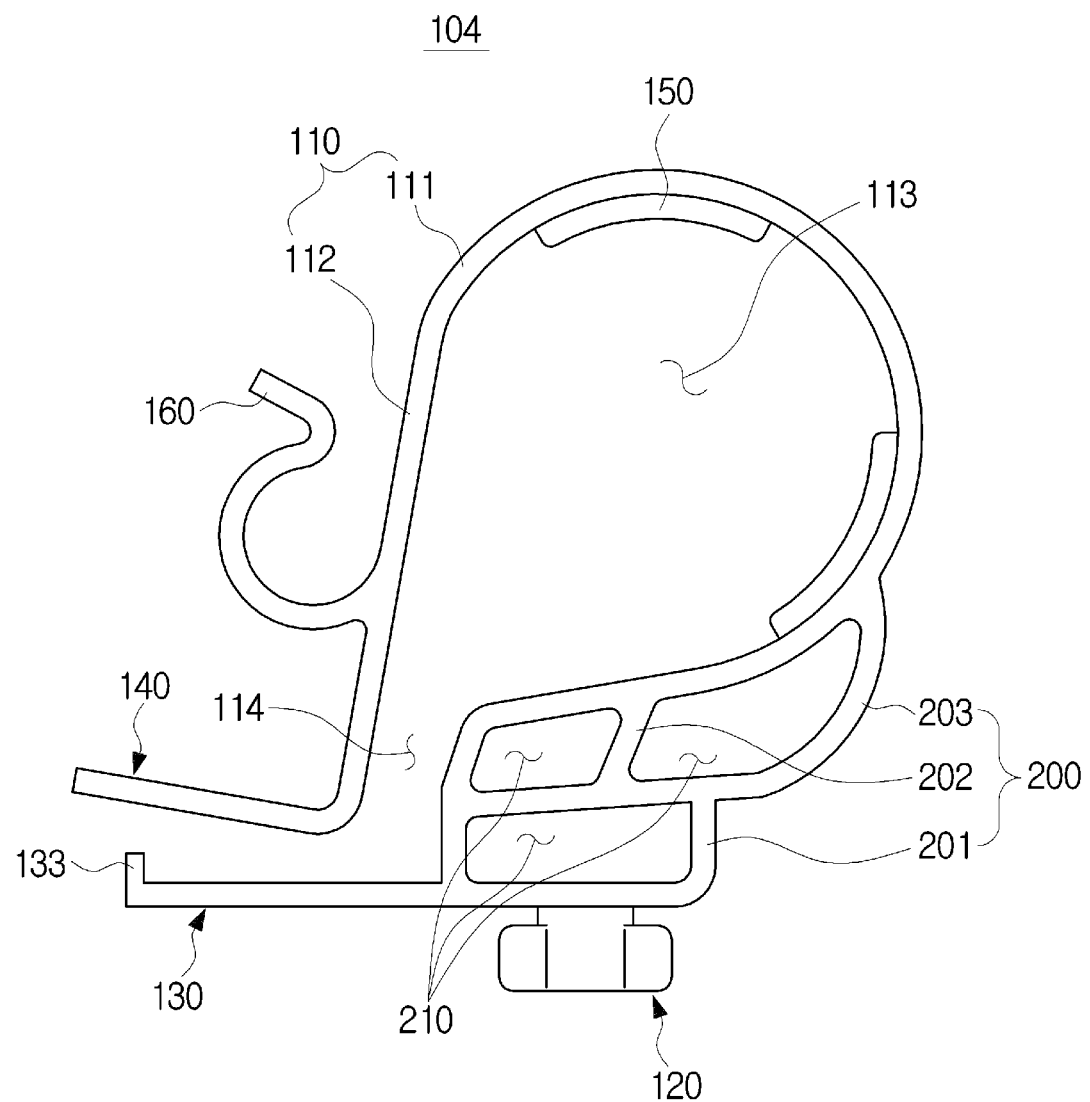

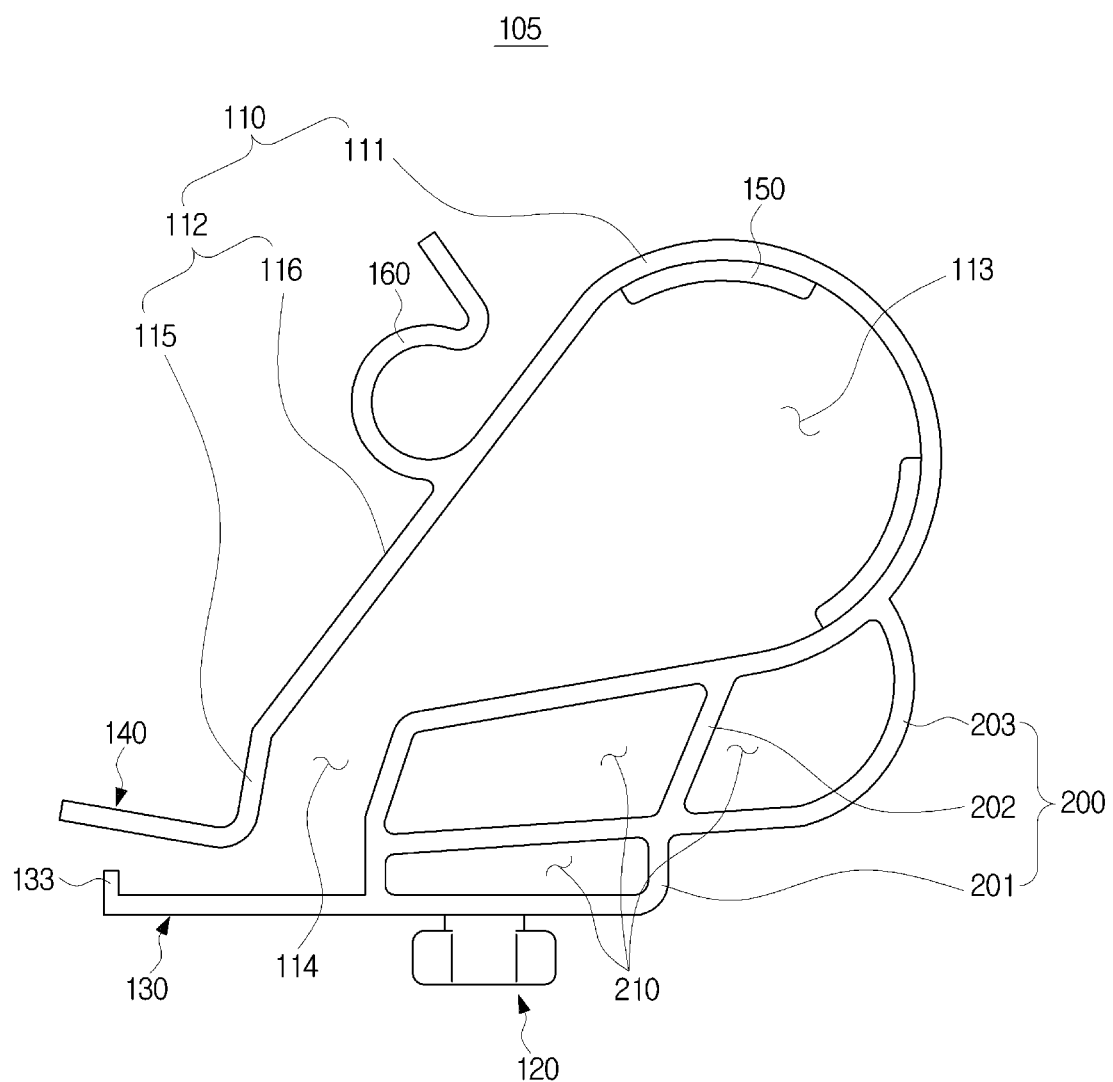
[Fig. 10]

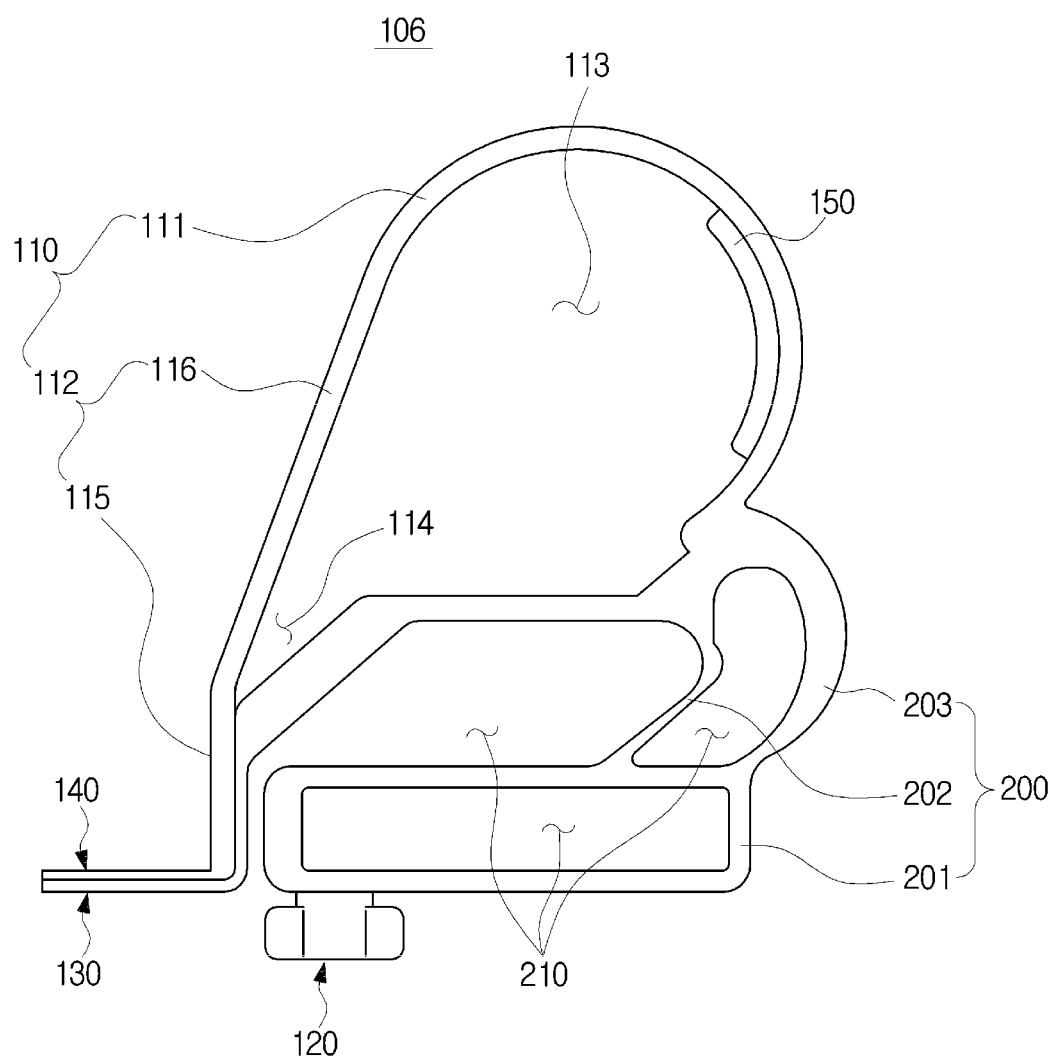
[Fig. 11]

WASHING MACHINE

CROSS-REFERENCE TO RELATED APPLICATIONS

This application is a U.S. National Stage Application which claims the benefit under 35 U.S.C. § 371 of International Patent Application No. PCT/KR2018/003425 filed on Mar. 23, 2018, which claims foreign priority benefit under 35 U.S.C. § 119 of Japanese Patent Application No. 10-2017-0067993 filed on May 31, 2017 in the Japanese Intellectual Property Office, the contents of both of which are incorporated herein by reference.

TECHNICAL FIELD

The present disclosure relates to a washing machine, and more particularly, to a washing machine including a holder capable of fixing a hose.

BACKGROUND ART

Generally, a washing machine is a device that removes dirt from laundry by having dirty laundry put therein, applying a proper detergent and a mechanical force, and performing washing, rinsing, spin-drying, and drying processes.

Particularly, a fully automatic washing machine includes a tub configured to store washing water, a rotating drum rotatably installed inside the tub, a pulsator rotatably installed at the bottom of the rotating drum, and a motor and a clutch for rotating the rotating drum and the pulsator.

As the rotating drum and the pulsator rotate in a state in which the laundry and washing water are put inside the rotating drum, the pulsator agitates the laundry put inside the rotating drum together with the washing water to remove dirt from the laundry.

Generally, in the spin-drying process of the washing machine, instead of directly guiding water downward, in order to prevent the risk that water in the tub is rapidly drained downward due to unintentional power off such as a power failure (natural drainage), a drain hose is used to guide the washing water upward to above the water level in the tub and then downward again to drain the washing water.

Because the drain hose has to be fixed to one surface of a cabinet during the washing, rinsing, and spin-drying processes, a device for fixing the drain hose is necessary. The drain hose is fixed to one surface of the cabinet by a screw.

Vibration of a drain pump itself that occurs in a process in which the drain pump operates is transmitted along the drain hose connected to the drain pump and becomes a cause of vibration noise of the cabinet to which the drain hose is fixed.

Generally, this phenomenon may become worse when a drain hose is in close contact with a cabinet. In a structure in which a drain hose is in close contact with a cabinet, since, during an operation of a drain pump, vibration of the drain hose is transmitted to the cabinet while the drain hose is in close contact with the cabinet, noise transferred to the cabinet may be further increased.

DISCLOSURE

Technical Problem

The present disclosure relates to a washing machine including an improved holder so that the assembling ability is improved between a cabinet and the holder.

The present disclosure relates to a washing machine including an improved holder so that transmission of vibration from a drain hose to a cabinet is prevented.

Technical Solution

According to an aspect of the present disclosure, a washing machine includes a cabinet, a tub provided inside the cabinet, a drain pump provided to discharge washing water accommodated in the tub to the outside of the cabinet, a drain hose configured to guide the washing water pumped by the drain pump to the outside of the cabinet, and a holder coupled to an outer surface of the cabinet to fix the drain hose to the cabinet, wherein the holder includes an accommodating portion provided to accommodate the drain hose and a damping portion configured to cause the drain hose to be spaced apart from the cabinet so that, when the washing water is drained, vibration of the drain hose due to the drain pump is prevented from being transmitted to the cabinet.

The damping portion may be provided between the accommodating portion and the cabinet.

The damping portion may include a closed-loop surface.

The damping portion may include an opening.

The damping portion may include a first damping portion coming in contact with the cabinet and a second damping portion provided between the first damping portion and the accommodating portion.

The damping portion may further include a third damping portion coming in contact with the second damping portion and the accommodating portion.

The holder may further include a rib provided between the accommodating portion and the damping portion.

The holder may further include a catching member provided in the damping portion to allow the holder to be coupled to the outer surface of the cabinet, and the cabinet may include a catching hole into which the catching member is inserted.

The holder may further include a support portion which extends from the damping portion and comes in contact with the cabinet and a coupling portion which is bent from the accommodating portion and comes in contact with the support portion.

The coupling portion may include an assembling member facing the support portion, and the support portion may include an assembling hole into which the assembling member is inserted.

The accommodating portion may include a closed-loop surface when the assembling member is inserted into the assembling hole.

The coupling portion and the support portion may each include a fastening hole to allow fastening to the cabinet.

The holder may further include a movement preventing protrusion which protrudes from an inner circumferential surface of the accommodating portion toward an outer circumferential surface of the drain hose accommodated in the accommodating portion.

The holder may further include a wire fixing member extending from the accommodating portion.

The holder may be elastically deformed to allow the drain hose to be inserted into the accommodating portion.

Advantageous Effects

According to the present disclosure, since a holder functions as both a guide for guiding a drain hose and a clamp for fixing the drain hose, the assembling ability can be improved between a cabinet and the holder.

According to the present disclosure, since a structure of the holder is improved to include a damping portion, noise due to vibration that is transferred from the drain hose to a cabinet can be reduced.

DESCRIPTION OF DRAWINGS

FIG. 1 is a schematic side cross-sectional view of a washing machine according to the present disclosure.

FIG. 2 is a view illustrating a state in which a drain hose is coupled to a rear frame in the washing machine according to the present disclosure.

FIG. 3 is a view illustrating a state in which the drain hose and a holder are disassembled from the rear frame in the washing machine according to the present disclosure.

FIG. 4 is a view illustrating the holder in the washing machine according to an embodiment of the present disclosure.

FIG. 5 is a view illustrating a state in which the drain hose is fixed to the holder in the washing machine according to an embodiment of the present disclosure.

FIG. 6 is a cross-sectional view of a holder in a washing machine according to another embodiment of the present disclosure.

FIG. 7 is a cross-sectional view of a holder in a washing machine according to another embodiment of the present disclosure.

FIG. 8 is a cross-sectional view of a holder in a washing machine according to another embodiment of the present disclosure.

FIG. 9 is a cross-sectional view of a holder in a washing machine according to another embodiment of the present disclosure.

FIG. 10 is a cross-sectional view of a holder in a washing machine according to another embodiment of the present disclosure.

FIG. 11 is a cross-sectional view of a holder in a washing machine according to another embodiment of the present disclosure.

MODES OF THE INVENTION

Embodiments described herein and configurations illustrated in the drawings are merely exemplary embodiments of the present disclosure, and various modified embodiments which may replace the embodiments and the drawings herein may be present at the time of filing this application.

Like reference numerals or symbols presented in the drawings of the application indicate parts or elements that perform substantially the same functions. Also, terms used herein are for describing the embodiments and are not intended to limit and/or restrict the disclosure.

A singular expression includes a plural expression unless context clearly indicates otherwise. In the application, terms such as "include" or "have" are for designating that features, number, steps, operations, elements, parts, or combinations thereof are present.

Therefore, the terms do not preclude the presence of or the possibility of adding one or more other features, numbers, steps, operations, elements, parts, or combinations thereof in advance.

Terms including ordinals such as "first" and "second" may be used to describe various elements, but the elements are not limited by the terms. The terms are only used for the purpose of distinguishing one element from another element.

For example, a first element may be referred to as a second element while not departing from the scope of the present disclosure, and likewise, a second element may also be referred to as a first element.

The term "and/or" includes a combination of a plurality of related items or any one item among the plurality of related items.

Meanwhile, terms such as "front," "rear," "upper portion," and "lower portion" used in the following description are defined on the basis of the drawings, and a shape and a position of each of the elements are not limited by the terms.

Hereinafter, exemplary embodiments according to the present disclosure will be described in detail with reference to the accompanying drawings.

A washing machine 1 according to the present disclosure may be a fully automatic washing machine in particular but is not limited thereto. The washing machine 1 may be various other types of washing machines including a drum washing machine. Hereinafter, description will be given focusing on a fully automatic washing machine.

FIG. 1 is a schematic side cross-sectional view of a washing machine according to the present disclosure. As illustrated in FIG. 1, the washing machine 1 may include a cabinet 10 forming an exterior and a tub 20 provided inside the cabinet 10 to store washing water.

The cabinet 10 may include a front frame 11, a side frame 12, and a rear frame 13.

The washing machine 1 may include a rotating drum 30 rotatably disposed inside the tub 20 and configured to accommodate laundry and a driving device 40 disposed under the rotating drum 30 to rotate the rotating drum 30.

The washing machine 1 may include a flange shaft 80 which is coupled to the bottom of the rotating drum 30 to be connected to the driving device 40 and is configured to transmit a rotating force of the driving device 40 to the rotating drum 30.

The driving device 40 may be disposed under the tub 20 and may receive electric power and generate a rotating force to rotate the rotating drum 30 connected to the driving device 40.

The driving device 40 may include a clutch 41 configured to selectively rotate the rotating drum 30 and a pulsator 34 and a driving motor 42 configured to drive the clutch 41.

The driving device 40 may include a rotating shaft 43 connected to the flange shaft 80 coupled to the bottom of the rotating drum 30 to rotate the flange shaft 80.

An upper cover 15 having a laundry inlet 14 formed may be provided at an upper portion of the cabinet 10 so that laundry may be put inside the rotating drum 30, and a door 16 for opening and closing the laundry inlet 14 may be provided in the upper cover 15.

The tub 20 may be provided to store washing water and may be disposed inside the cabinet 10 to be supported inside the cabinet 10 by a suspension device 21.

The rotating drum 30 may be formed in a substantially hollow cylindrical shape and may be rotatably disposed inside the tub 20. The rotating drum 30 may include a body portion 31 having a cylindrical shape.

The body portion 31 may have a hollow cylindrical shape, an upper surface and a lower surface of the body portion 31 may be open, and a plurality of through-holes 32 may be provided in a side surface of the body portion 31 to allow the washing water to pass into and out of the rotating drum 30.

The washing machine 1 may include a balancer 33 provided at an upper portion of the rotating drum 30.

The pulsator 34 may be rotatably installed at the bottom of the rotating drum 30. The pulsator 34 may serve to agitate the laundry introduced into the rotating drum 30 together with the washing water.

A water supply device 50 for supplying the washing water into the rotating drum 30 may be installed at the upper portion of the rotating drum 30.

The water supply device 50 may include a water supply valve 52 configured to control the supply of water and a water supply tube 51 configured to connect the water supply valve 52 and a detergent supply device 60.

One side of the water supply tube 51 may be connected to an external water supply source (not illustrated), and the other side of the water supply tube 51 may be connected to the detergent supply device 60.

The detergent supply device 60 may include a case 61 provided inside the upper cover 15 and a detergent dispenser 62 detachably mounted on the case 61 and configured to store each detergent.

An outlet 63 for discharging the washing water in which a detergent is dissolved may be formed in a bottom surface of the case 61.

The water supplied through the water supply tube 51 may be supplied into the rotating drum 30 together with the detergent via the detergent supply device 60.

A drain device 70 for discharging the washing water to the outside of the cabinet 10 after a washing process or a spin-drying process is completed may be provided at the lower portion of the rotating drum 30.

The drain device 70 may include a drain tube 71 connected to the lower portion of the tub 20 and configured to guide the washing water inside the tub 20 to be discharged to the outside of the tub 20 and a drain valve 72 disposed in the drain tube 71 to open and close the drain tube 71.

The drain device 70 may include a drain pump 73 provided under the tub 20 to allow the washing water inside the tub 20 to be discharged to the outside of the cabinet 10.

The drain tube 71 may connect the tub 20 and the drain pump 73 to allow the washing water inside the tub 20 to be introduced into the drain pump 73.

FIG. 2 is a view illustrating a state in which a drain hose is coupled to a rear frame in the washing machine according to the present disclosure. FIG. 3 is a view illustrating a state in which the drain hose and a holder are disassembled from the rear frame in the washing machine according to the present disclosure.

As illustrated in FIGS. 2 and 3, the drain device 70 may include a drain hose 74 configured to guide washing water pumped by the drain pump 73 to the outside of the cabinet 10.

The drain hose 74 may be withdrawn through a rear surface of the cabinet 10 by passing through a hose hole 76 formed in the rear frame 13.

The drain hose 74 may include corrugations 75 so as to be stretched by a predetermined amount.

The drain hose 74 withdrawn through the rear surface of the cabinet 10 may be fixed to an outer surface of the rear frame 13 by a holder 100. However, the present disclosure is not limited thereto, and the holder 100 may be provided at various positions other than the rear frame 13, such as the side frame 12 constituting the cabinet 10.

For example, the holder 100 may be provided on a bottom surface of the inside of the cabinet 10 and fix the drain hose 74.

The holder 100 according to the present disclosure is used for fixing the drain hose 74 connected to the drain pump 73. However, the present disclosure is not limited thereto, and the holder 100 may be used for fixing various other hoses connected to various other pumps used in the washing machine 1.

For example, the holder 100 may be used for fixing a circulation hose connected to a circulation pump.

The washing machine 1 may include a catching hole 77 that may be assembled to the holder 100. The catching hole 77 may be formed in the rear frame 13 at a height corresponding to half or more of the height of the cabinet 10 from the bottom surface of the cabinet 10 so that the holder 100 is disposed at an upper portion of the drain pump 74.

The catching hole 77 may be coupled to a catching member 120 of the holder 100 that will be described below. By installing the holder 100 at the upper portion of the drain pump 74, natural drainage may be prevented from occurring along the drain hose 74 coupled to the holder 100.

A holder fastening hole 78 may be formed in the rear frame 13 together with the catching hole 77. The holder fastening hole 78 may be arranged coaxially with fastening holes 132 and 142 of the holder 100 that will be described below and allow fastening between the rear frame 13 and the holder 100 by a separate fastening member 79 such as a screw.

FIG. 4 is a view illustrating the holder in the washing machine according to an embodiment of the present disclosure. As illustrated in FIG. 4, the holder 100 may include an accommodating portion 110 provided to accommodate the drain hose 74.

The accommodating portion 110 may include an accommodating hole 113 capable of accommodating the drain hose 74 and an insertion portion 114 that is open so that the drain hose 74 may be inserted into the accommodating hole 113. The accommodating hole 113 may form a substantially circular shape along the shape of the drain hose 74.

The accommodating portion 110 may include a first accommodating portion 111 which forms the accommodating hole 113 and a second accommodating portion 112 which extends from the first accommodating portion 111 and forms a substantially straight line.

The holder 100 may include a damping portion 200 configured to cause the drain hose 74 to be spaced apart from the cabinet 10 so that, when the washing water is drained, vibration of the drain hose 74 due to the drain pump 73 is prevented from being transmitted to the cabinet 10.

The damping portion 200 may include a damping hole 210 that is open so that vibration transmitted from the drain hose 74 to the cabinet 10 may be absorbed. The damping portion 200 may include a closed-loop surface.

The damping portion 200 may be provided between the accommodating portion 110 and the cabinet 10. That is, the damping portion 200 may be provided between the accommodating portion 110 and the rear frame 13.

The damping portion 200 may be provided as a plurality of damping portions 200. The damping portion 200 may include a first damping portion 201 coming in contact with the cabinet 10 and a second damping portion 202 provided between the first damping portion 201 and the accommodating portion 110.

The plurality of damping portions 200 may have different sizes. However, the present disclosure is not limited thereto, and the sizes of the plurality of damping portions 200 may also be the same.

The holder 100 may include the catching member 120 provided in the damping portion 200 to allow the holder 100 to be coupled to the outer surface of the cabinet 10. The catching member 120 may be inserted into the catching hole 77 provided in the rear frame 13 and couple the holder 110 to the cabinet 10.

The holder 100 may include a support portion 130 which extends from the damping portion 200 and comes in contact with the cabinet 10 and a coupling portion 140 which is bent from the accommodating portion 110 and comes in contact with the support portion 130.

The coupling portion 140 may be bent from the second accommodating portion 112 and extend.

The coupling portion 140 may include an assembling member 141 protruding toward the support portion 130, and the support portion 130 may include an assembling hole 131 into which the assembling member 141 is inserted.

The assembling member 141 and the assembling hole 131 are each illustrated in FIG. 4 as having a substantially semicircular shape. However, the present disclosure is not limited thereto, and the assembling member 141 and the assembling hole 131 may have various other shapes as long as the shapes may be assembled to each other.

The coupling portion 140 may extend from the second accommodating portion 112 so that an inner surface of the coupling portion 140 and an inner surface of the support portion 130 face each other.

The support portion 130 and the coupling portion 140 may include the fastening holes 132 and 142, respectively, to be fastened to the cabinet 10.

The support portion 130 may include a support protrusion 133 which is provided at one end portion, bent toward the coupling portion 140, and extends.

The holder 100 may include a movement preventing protrusion 150 which protrudes from an inner circumferential surface of the accommodating portion 110 toward an outer circumferential surface of the drain hose 74 accommodated in the accommodating portion 110.

The movement preventing protrusion 150 may be formed at an inner surface of the accommodating portion 110 to prevent the drain hose 74 from falling out of the holder 100. Specifically, the movement preventing protrusion 150 may protrude toward the center of the accommodating hole 113 so as to be coupled between the corrugations 75 formed at the outer circumferential surface of the drain hose 74.

The movement preventing protrusion 150 may be provided as a plurality of movement preventing protrusions 150. The plurality of movement preventing protrusions 150 may be disposed to be spaced apart from each other at the inner surface of the accommodating portion 110.

The holder 100 may include a wire fixing member 160 extending from the accommodating portion 110. The wire fixing member 160 may guide a wire for an operation of the washing machine 1. The wire fixing member 160 may have an arc shape that is partially open.

In FIG. 4, the wire fixing member 160 is illustrated as being disposed at a position extending from the second accommodating portion 112. However, the present disclosure is not limited thereto, and the wire fixing member 160 may be disposed at any various other positions as long as the wire fixing member 160 is able to guide the wire together with the drain hose 74.

Therefore, the holder 100 may fix and guide the drain hose 74 through the accommodating portion 110 and guide the wire through the wire fixing member 160.

Materials of the holder 100 may include polyamide (nylon), polypropylene, and rubber. However, the present disclosure is not limited thereto.

FIG. 5 is a view illustrating a state in which the drain hose is fixed to the holder in the washing machine according to an embodiment of the present disclosure. As illustrated in FIG. 5, the accommodating portion 110 may have a closed-loop surface to prevent the drain hose 74 from falling out of the accommodating portion 110.

The holder 100 may be rotated 90° after insertion of the catching member 120 into the catching hole 77. In this way, the holder 100 may be primarily assembled to the outer surface of the cabinet 10. The catching member 120 may have a substantially cylindrical shape having a catching protrusion formed at both sides.

However, the present disclosure is not limited thereto, and the catching member 120 may have various other shapes as long as the catching member 120 may be assembled and fixed to the catching hole 77.

The drain hose 74 withdrawn to the outside of the cabinet 10 through the hose hole 76 provided in the rear frame 13 may be accommodated in the accommodating hole 113 through the insertion portion 114 of the holder 110 assembled to the rear frame 13.

The holder 100 may be elastically deformed to allow the drain hose 74 to be inserted into the accommodating portion 110. That is, since the size of the insertion portion 114 is smaller than the size of the drain hose 74, it may be difficult to insert the drain hose 74 into the accommodating hole 113 through the insertion portion 114.

Therefore, as the holder 100 is injection-molded from a material that is elastically deformable, the size of the insertion portion 114 may be enlarged so that the drain hose 74 may be inserted through the insertion portion 114.

The accommodating portion 110 may form a closed-loop surface as the assembling member 141 passes through the assembling hole 131 so as to surround the outer circumferential surface of the drain hose 74, and the coupling portion 140 and the support portion 130 are coupled.

The support portion 130 of the holder 100 may be maintained in a state in which the support portion 130 is fixed to the rear frame 13. Before the drain hose 74 is fixed to the rear frame 13 by the holder 100, the coupling portion 140 extending from the accommodating portion 110 may be disposed opposite the support portion 130 while being spaced apart from the support portion 130.

That is, the support portion 130 and the coupling portion 140 may be spaced apart from each other and have an opening formed therebetween. The drain hose 74 may be inserted into the accommodating hole 113 through the insertion portion 114 between the support portion 130 and the coupling portion 140.

When the drain hose 74 is inserted into the accommodating hole 113 and an external force acts on an outer surface of the coupling portion 140 toward the rear frame 13, the assembling member 141 formed in the coupling portion 140 may be assembled to the assembling hole 131 formed in the support portion 130.

As the accommodating portion 110 forms the closed-loop surface, the drain hose 74 may be primarily prevented from falling out of the accommodating hole 113.

The support portion 130 may include, at one end portion thereof, the support protrusion 133 which is bent toward the coupling portion 140 and extends. Therefore, since one end portion of the coupling portion 140 that comes in contact with the support portion 130 interferes with the support protrusion 133, the coupling portion 140 may be more stably coupled to the support portion 130.

As the assembling member 141 is assembled to the assembling hole 131, the one end portion of the coupling portion 140 may come in close contact with the one end portion of the support portion 130 and form the accommodating portion 110 including the closed-loop surface.

The movement preventing protrusion 150 may be caught by and fixed to the corrugations 75 formed at the outer circumferential surface of the drain hose 74 accommodated in the accommodating hole 113. Therefore, the movement preventing protrusion 150 may secondarily prevent the drain hose 74 from falling out of the accommodating portion 110.

The support portion 130 of the holder 100 may be fixed to the outer surface of the rear frame 13 and support the holder 110 so that the holder 100 is stably coupled to the rear frame 13.

The insertion portion 114 may include a space formed between the second accommodating portion 112 and the damping portion 200.

FIG. 6 is a cross-sectional view of a holder in a washing machine according to another embodiment of the present disclosure. As illustrated in FIG. 6, a holder 101 may include a structure that is mostly the same as that of the holder 100 according to the above-described embodiment of the present disclosure. A difference may exist in terms of the number of movement preventing protrusions 150.

Unlike the holder 100 according to the above-described embodiment of the present disclosure, the holder 101 may include two movement preventing protrusions 150.

The holder 101 may include a damping portion 200 whose size is different from that of the holder 100 according to the above-described embodiment of the present disclosure. In the holder 101, an upper side of a second damping portion 202 coming into contact with an accommodating portion 110 may include a slope toward a rear frame 13 instead of being formed in an arc shape.

Therefore, as compared with the accommodating hole 113 of the holder 100 according to the above-described embodiment of the present disclosure, an accommodating hole 113 of the holder 101 may form a relatively less circular shape.

FIG. 7 is a cross-sectional view of a holder in a washing machine according to another embodiment of the present disclosure. As illustrated in FIG. 7, a holder 102 may include a structure that is mostly the same as that of the holder 101 according to the above-described other embodiment of the present disclosure. The holder 102 may be different from the holder 101 in that the holder 102 includes a single damping portion 200.

The holder 102 may include a rib 170 provided between an accommodating portion 110 and the damping portion 200.

The rib 170 may reinforce a stiffness of the accommodating portion 110. That is, since the above-described second damping portion 202 is eliminated, the holder 102 may include an empty space between the accommodating portion 110, which is configured to fix a drain hose 74, and a first damping portion 201.

The holder 102 may include the rib 170 in order to reinforce the stiffness of the accommodating portion 110 configured to fix the drain hose 74 that is lowered due to the empty space between the accommodating portion 110 and the first damping portion 201. The rib 170 may be provided in various sizes.

FIG. 8 is a cross-sectional view of a holder in a washing machine according to another embodiment of the present disclosure. As illustrated in FIG. 8, a holder 103 may include a structure that is mostly the same as that of the holder 101 according to the above-described other embodiment of the present disclosure. A difference may exist in terms of a structure of a second damping portion 202.

The holder 101 may include a second damping portion 202 whose size is larger than that of the second damping portion 202 of the holder 101 according to the above-described other embodiment of the present disclosure.

The holder 103 may include the second damping portion 202 whose size is larger than that of a first damping portion 201.

FIG. 9 is a cross-sectional view of a holder in a washing machine according to another embodiment of the present disclosure. As illustrated in FIG. 9, a holder 104 may include a structure that is mostly the same as that of the holder 101 according to the above-described other embodiment of the present disclosure. A difference may exist in terms of the number of damping portions 200.

The holder 104 may include a first damping portion 201, a second damping portion 202, and a third damping portion 203 coming in contact with the second damping portion 202 and an accommodating portion 11.

The damping portions 200 of the holder 104 may include the second damping portion 202 and the third damping portion 203 which are formed by dividing the second damping portion 202 of the holder 103 according to the above-described other embodiment of the present disclosure.

The second damping portion 202 and the third damping portion 203 may be disposed between the accommodating portion 110 and the first damping portion 201. The third damping portion 203 may come in contact with all of the first damping portion 201, the second damping portion 202, and the accommodating portion 110.

FIG. 10 is a cross-sectional view of a holder in a washing machine according to another embodiment of the present disclosure. As illustrated in FIG. 10, a holder 105 may include a structure that is mostly the same as that of the holder 104 according to the above-described other embodiment of the present disclosure. A difference may exist in terms of a structure of a second accommodating portion 112.

While the second accommodating portion 112 of the holder 104 according to the above-described other embodiment of the present disclosure is right-angled, a second accommodating portion 112 of the holder 105 may include a bent portion.

The second accommodating portion 112 of the holder 105 may include a right-angled portion 115 which is, when a support portion 130 and a coupling portion 140 are coupled, bent from the coupling portion 140 and forms a right angle therewith and an inclined portion 116 which is bent from the right-angled portion 115 and connected to a first accommodating portion 111 with a slope.

Since the second accommodating portion 112 includes the inclined portion 116, when the support portion 130 and the coupling portion 140 are coupled, an accommodating hole 113 may have a fan shape instead of a substantially circular shape.

A damping portion 200 of the holder 105 may have a size that is relatively larger than the damping portion 200 of the holder 104 according to the above-described other embodiment of the present disclosure.

FIG. 11 is a cross-sectional view of a holder in a washing machine according to another embodiment of the present disclosure. As illustrated in FIG. 11, a holder 106 may include a structure that is mostly the same as that of the holder 105 according to the above-described other embodiment of the present disclosure. The holder 106 may be different from the holder 105 in that a wire fixing member 160 is eliminated.

In the holder 106, one side of a second accommodating portion 112 and one side of a second damping portion 202 may come in contact with each other. That is, as compared with the holder 105 according to the above-described other embodiment of the present disclosure, the size of an insertion portion 114 of the holder 106 may be relatively smaller.

Unlike the holder 105 according to the above-described other embodiment of the present disclosure, the holder 106 may include a single movement preventing protrusion 150.

The above-described support protrusion 113 capable of stably reinforcing the coupling between the coupling portion 140 and the support portion 130 may be eliminated from a support portion 130 of the holder 106.

A second damping portion 202 of the holder 106 may not form a closed-loop surface, unlike a first damping portion 201 and a third damping portion 203 of the holder 106. That is, the second damping portion 202 may include an opening.

The technical idea of the present disclosure has been described above with reference to specific exemplary embodiments, but the scope of the present disclosure is not limited by the embodiments.

Within the scope not departing from the gist of the technical idea of the present disclosure stated in the claims below, various embodiments obtained by those of ordinary skill in the art modifying or changing the above-described embodiments also belong to the scope of the present disclosure.

The invention claimed is:

1. A washing machine, comprising:
a cabinet;
a tub disposed inside the cabinet;
a drain pump to discharge washing water accommodated in the tub to the outside of the cabinet;
a drain hose configured to guide the washing water pumped by the drain pump to the outside of the cabinet; and
a holder coupled to an outer surface of the cabinet to fix the drain hose to the cabinet, wherein the holder includes:
an accommodating portion to accommodate the drain hose and including a curved portion at one end of the accommodating portion and a straight portion at another end of the accommodating portion which extends in a direction toward the outer surface of the cabinet,
a support portion fixed to the outer surface of the cabinet,
a damping portion, disposed between the curved portion and the support portion, configured to cause the drain hose to be spaced apart from the cabinet so that, when the washing water is drained, vibration of the drain hose due to the drain pump is prevented from being transmitted to the cabinet, and
a coupling portion, extending from the straight portion in a direction perpendicular to the straight portion and away from the damping portion, wherein in a first state of the coupling portion a gap is formed between the coupling portion and the support portion to allow the drain hose to be inserted into the accommodating portion via the gap, and in a second state of the coupling portion the coupling portion is fixed directly to the support portion.

2. The washing machine of claim 1, wherein the damping portion is spaced apart from the straight portion in the direction perpendicular to the straight portion when the coupling portion is in the second state.

3. The washing machine of claim 1, wherein the damping portion includes a closed-loop surface.

4. The washing machine of claim 1, wherein the damping portion includes an opening.

5. The washing machine of claim 1, wherein the damping portion includes a first damping portion in contact with the cabinet and a second damping portion disposed between the first damping portion and the curved portion.

6. The washing machine of claim 5, wherein the damping portion further includes a third damping portion in contact with the second damping portion and the curved portion.

7. The washing machine of claim 1, wherein the holder further includes a rib disposed between the accommodating portion and the damping portion.

8. The washing machine of claim 1, wherein:
the holder further includes a catching member extending from the damping portion to allow the holder to be coupled to the outer surface of the cabinet, and
the cabinet includes a catching hole into which the catching member is inserted.

9. The washing machine of claim 1, wherein:
the support portion includes a support protrusion which protrudes from an end of the support portion in a direction perpendicular to a surface of the support portion facing the coupling portion and away from the cabinet, and
an inner side surface of the support protrusion is configured to contact an outer side surface of the coupling portion facing away from the damping member, when the coupling portion is in the second state.

10. The washing machine of claim 9, wherein:
the coupling portion includes an assembling member facing the support portion; and
the support portion includes an assembling hole into which the assembling member is inserted.

11. The washing machine of claim 10, wherein the accommodating portion includes a closed-loop surface when the assembling member is inserted into the assembling hole.

12. The washing machine of claim 9, wherein the coupling portion and the support portion each include a fastening hole to allow fastening to the cabinet.

13. The washing machine of claim 1, wherein the holder further includes a movement preventing protrusion which protrudes from an inner circumferential surface of the accommodating portion toward an outer circumferential surface of the drain hose accommodated in the accommodating portion.

14. The washing machine of claim 1, wherein the holder further includes a wire fixing member extending from the accommodating portion.

15. The washing machine of claim 1, wherein the holder is elastically deformed to allow the drain hose to be inserted into the accommodating portion.

16. The washing machine of claim 1, wherein the accommodating portion further includes a plurality of movement preventing protrusions which protrude inwardly from an inner circumferential surface of the accommodating portion, the plurality of movement preventing protrusions being spaced apart from one another in a circumferential direction of the accommodating portion.

17. The washing machine of claim 1, wherein the accommodating portion further includes an inclined portion having one end connected to the curved portion and another end connected to the straight portion.

18. The washing machine of claim 1, wherein the damping portion includes:

a first damping portion having a closed-loop surface and in contact with the cabinet, and a second damping portion, disposed between the first damping portion and the curved portion, and having an opening formed by a gap that separates the first damping portion from the support portion in the direction perpendicular to the straight portion, when the coupling portion is in the second state.

19. The washing machine of claim 1, wherein the damping portion includes:

a third damping portion in contact with the first damping portion, the second damping portion, and the curved portion.

20. The washing machine of claim 1, wherein when the coupling portion is in the second state, a part of the curved portion which is closest to the cabinet is spaced apart from the cabinet by a thickness of the damping portion.

* * * * *